United States Patent [19]

Emery

[11] 4,174,057

[45] Nov. 13, 1979

[54] LIQUID MEASURING AND DISPENSING DEVICES

[75] Inventor: John A. Emery, Chicester, England

[73] Assignee: Sinclair International Bar Services Limited, Chichester, England

[21] Appl. No.: 885,946

[22] Filed: Mar. 13, 1978

[30] Foreign Application Priority Data

Mar. 14, 1977 [GB] United Kingdom ............... 10680/77

[51] Int. Cl.$^2$ ............................................. G01F 11/16

[52] U.S. Cl. ..................................... 222/332; 222/361

[58] Field of Search ............... 222/442, 447, 449, 451, 222/453, 361, 332

[56] References Cited

U.S. PATENT DOCUMENTS

| | | | |
|---|---|---|---|
| 963,633 | 7/1910 | Newland | 222/442 X |
| 1,637,246 | 7/1927 | Seaver | 222/361 X |
| 2,314,384 | 3/1943 | Berwick et al. | 222/442 |
| 2,805,004 | 9/1957 | Burns et al. | 222/442 |
| 2,864,538 | 12/1958 | Rasmussen | 222/453 |

*Primary Examiner*—Francis J. Bartuska
*Attorney, Agent, or Firm*—Perry Carvellas

[57] ABSTRACT

A liquid measuring and dispensing device has a central flow tube sealingly surrounded by a measuring chamber slidable relative to the flow tube so as to bring respective ports in the flow tube and the chamber into register for filling and emptying the chamber through the two ends of the flow tube which form inflow and outflow ducts respectfully, and a shuttle valve within the flow tube and between the ducts and movable with the chamber to isolate the portion of the flow tube between its ports and thereby prevent direct flow along the flow tube between the ducts, the outside diameter of the flow tube surrounding the inlet duct being reduced in diameter so as to provide an air vent for the chamber during emptying.

6 Claims, 2 Drawing Figures

LIQUID MEASURING AND DISPENSING DEVICES

In accordance with the invention a liquid measuring and dispensing device comprises a central flow tube with means intermediate its ends to divide the tube into inflow and outflow ducts, each duct having a respective inflow and outflow port in the tube side wall, a measuring chamber embracing the flow tube and having a cylindrical inside wall axially slidable along the outer surface of the flow tube and provided with liquid seals adjacent its ends in contact with the said outer surface, and further ports in the chamber inside wall arranged so that at one end of the sliding movement of the chamber one of said further ports is in register with the inflow port and at the other end of the sliding movement of the chamber the other of said further ports is in register with the outflow port, and wherein the outside diameter of the flow tube is reduced over a portion of its length to cause one of the said seals to lose sealing contact with the tube as the outflow port comes into register with its respective port in the chamber inner wall and thereby vent the chamber to atmosphere, and wherein the means to divide the flow tube comprises a shuttle within the flow tube fixed to the measuring chamber and having sealing means at each end for isolating a portion of the flow tube between the seals from the inflow and outflow ducts, the sealing means being located between the respective ends of that portion of the chamber inside wall extending between the further ports in the inside wall of the measuring chamber.

In a preferred form of the invention, the shuttle is fixed to the chamber by a cross pin extending through the shuttle and opposed longitudinal slots in the flow tube, the ends of the cross pin being fixed to the chamber inside wall. The sealing means comprise ring seals carried by piston heads on the shuttle ends.

Figure 1:
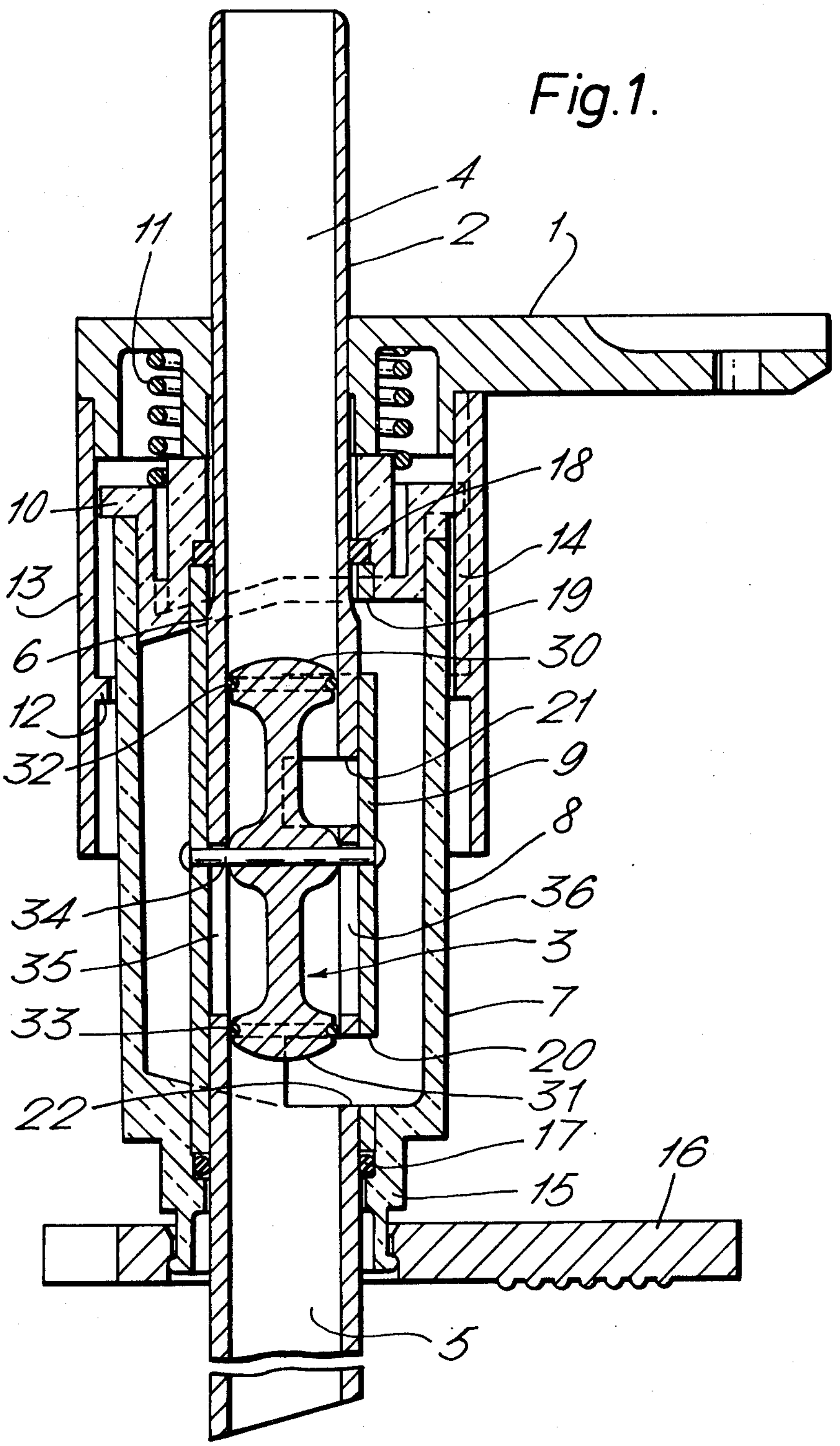
Figure 2:
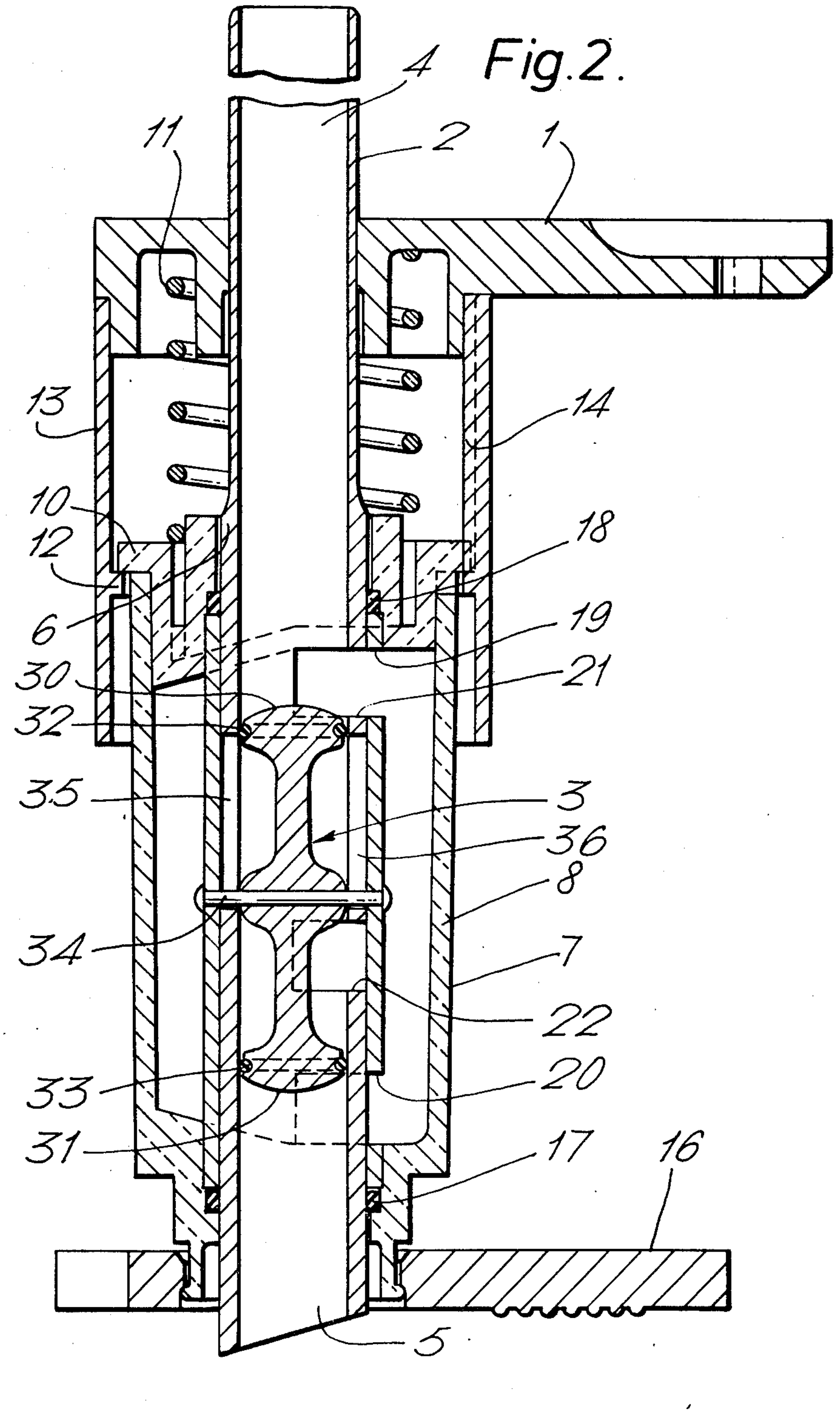

One embodiment of the invention will now be described with reference to the attached drawings in which:

FIG. 1 shows a longitudinal section of a measure in accordance with the invention in the emptying position, and FIG. 2 shows a similar view of the measure in the filling position.

The measure shown in the drawings comprises a support plate 1 to which a flow tube 2 is fixed so that its axis is vertical when the measure is in use. The top end of the tube is joined to means, not shown, to form a reasonable liquid-tight connection with the mouth of an upturned bottle mounted above the measure and from which liquid is to be dispensed.

The tube is embraced by a cylindrical measuring chamber 7 having a transparent outer wall 8, inner wall 9 closely fitting the tube 2, and a top closure 10 which forms a seating for a coiled compression spring 11 encircling the tube 2 and abutting the underside of the plate 1 to urge the chamber downwardly. The chamber 9 is freely slidable along the tube 2 between upper and lower positions shown respectively in FIGS. 1 and 2 and is retained at its lower position by the abutment of the top closure 10 against an internal flange 12 of a cylindrical cover 13 mounted on the plate 1.

An internal rib 14 on the cover mates with a slot in the closure to prevent rotation of the chamber.

A reduced diameter bottom end 15 of the wall 8 forms the bottom of the chamber and carries a spider 16 to engage the rim of a glass held below the measure.

The chamber can then be pushed upwardly along the tube by the glass when the measure is to be emptied into the glass.

At each of its ends the inner wall 9 is provided with a resilient ring seal 17,18. The lower seal 17 lies against the exterior of an outflow duct portion 5 of the tube to form a liquid-tight seal for the chamber bottom. The upper seal 18 similarly engages the exterior of an inflow duct portion 4 of the tube 2, but as the chamber approaches its uppermost end of travel, this seal moves past an end 6 of a reduced diameter length of the tube substantially co-extensive with the inflow duct 4 whereupon it loses its sealing engagement and vents the chamber to atmosphere.

The interior of the chamber is accurately made to a prescribed volume to be dispensed, e.g. 1/6 gill.

At the top and bottom ends of the chamber, two ports 19,20 are provided through the wall 9. The port 19 registers with an identical inflow port 21 in the bottom of the inflow duct 4 when the chamber is in its lowermost position (FIG. 2). The port 20 similarly registers with an outflow port 22 in the outflow duct 5 when the chamber is in its uppermost position (FIG. 1).

An intermediate length of the tube 2 between the inflow and outflow ducts is isolated by means comprising a shuttle 3 within the tube and which has a piston head 30,31 at its top and bottom ends respectively, each head carrying a ring seal 32,33 which engages the inside surface of the tube. The shuttle is linked to the chamber 7 for reciprocable movement therewith by a cross pin 34 passing through the shuttle and with its ends secured to the chamber wall 9. To allow free movement of the shuttle and chamber, longitudinal slots 35,36 co-extensive in length with the chamber travel are formed in the tube wall, the pin passing through the slots. The length of the shuttle is such that the seals 32 and 33 lie respectively just below the port 19 and just above the port 20.

The operating cycle of the measure starts from the FIG. 2 position when the liquid to be dispensed flows down the duct 4 through the ports 21 and 19 and into the chamber 7. The seal 32 lies against the tube wall just below the port 21 and prevents flow of the liquid down the tube beyond the port 21 and since theport 20 is out of register with the port 22 outflow from the chamber is prevented.

As the chamber is slid up the tube 2 by pressure of a glass rim against the spider 16, the ports 19,20 first go out of register to prevent any further inflow of liquid. As the upward movement of the chamber continues, the upper edge of port 20 reaches the lower edge of port 22 and at the same time the seal reaches the end 6 and thereafter vents the chamber. Further upward movement to the position shown in FIG. 1 registers ports 20 and 22 to allow rapid flow of the liquid from the chamber through the outflow duct 5 and into the glass. Any reverse flow of liquid up the pipe is prevented by the seal 33 which now lies against the tube wall just above the port 22.

When the glass is removed, the spring 11 returns the chamber to its lowermost, FIG. 2, position.

What is claimed is:

1. A liquid measuring and dispensing device comprising a central flow tube with means intermediate its ends to divide the tube into inflow and outflow ducts, each duct having a respective inflow and outflow port in the tube side wall, a measuring chamber embracing the flow tube and having a cylindrical inside wall axially slidable along the outer surface of the flow tube and provide with liquid seals adjacent its ends in contact with the said outer surface, and further ports in the chamber inside wall arranged so that at one end of the sliding movement of the chamber one of said further ports is in register with the inflow port and at the other end of the sliding movement of the chamber the other of said further ports is in register with the outflow port, and wherein the outside diameter of the flow tube is reduced over a portion of its length to cause one of the said seals to lose sealing contact with the tube as the outflow port comes into register with its respective port in the chamber inner wall and thereby vent the chamber to atmosphere, and wherein the means to divide the flow tube comprises a shuttle within the flow tube fixed to the measuring chamber and having sealing means at each end for isolating a portion of the flow tube between the seals from the inflow and outflow ducts, the sealing means being located between the respective ends of that portion of the chamber inside wall extending between the further ports in the inside wall of the measuring chamber.

2. A device according to claim 1 wherein the shuttle is fixed to the chamber by a cross pin extending through the shuttle and opposed longitudinal slots in the flow tube wall, the ends of the cross pin being fixed to the chamber inside wall.

3. A device according to claim 1 or 2 wherein the sealing means of the shuttle comprises ring seals carried by piston heads on the shuttle ends.

4. A device according to any of claim 1, wherein the chamber includes an outer cylindrical wall concentric with the inside wall and with a reduced diameter portion at one end to close that end of the chamber, and further includes a closure to close the other end of the chamber.

5. A device according to claim 4 wherein the said closure provides an abutment for a bicrossing spring urging the chamber in one direction of sliding movement and a stop engageable with an outer cover part to limit the sliding movement in the said one direction.

6. A device according to claim 4, wherein the outer chamber wall is transparent.

* * * * *